2-CYANOBENZIMIDAZOLES AND A PROCESS
FOR THEIR PREPARATION

Eva Lea Samuel, 27 Ludwell Crescent, Bentleigh, Victoria, Australia, and George Holan, 86 Were St., Brighton, Victoria, Australia
No Drawing. Filed Sept. 18, 1967, Ser. No. 668,637
Claims priority, application Australia, Sept. 19, 1966, 11,210/66
Int. Cl. C07d 49/38
U.S. Cl. 260—309.2     3 Claims

ABSTRACT OF THE DISCLOSURE 2-cyanobenzimidazoles of the formula:

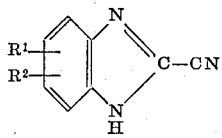

wherein $R^1$ and $R^2$ are independently selected from the group consisting of hydrogen, chlorine, bromine, nitro, alkyl of not more than four carbon atoms, and alkoxy of not more than four carbon atoms, exhibit antiseptic and bactericidal activity. The 2-cyanobenzimidazoles are prepared by the reaction of a benzimidazole of the formula

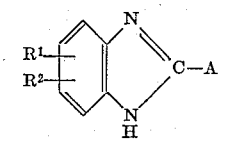

wherein $R^1$ and $R^2$ are as defined above and A is selected from trichloromethyl, monochlorodifluoromethyl and monofluorodichloromethyl, with ammonia.

---

This invention provides new organic compounds which are useful inter alia as bactericides, said compounds being 2-cyanobenzimidazoles of the formula:

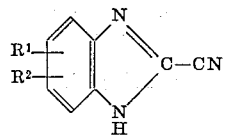

wherein $R^1$ and $R^2$ are independently selected from the group consisting of hydrogen, chlorine, bromine, nitro, alkyl of not more than four carbon atoms, and alkoxy of not more than four carbon atoms. Preferably where one of $R^1$ and $R^2$ is other than hydrogen it is in the 5-position of the ring and when both $R^1$ and $R^2$ are other than hydrogen they are in the 5,6-position of the ring. Examples of specific compounds of the above structural formula which are useful for the purpose of the invention are 2-cyanobenzimidazole; 2-cyano-5-chlorobenzimidazole; 2-cyano-5,6-dichlorobenzimidazole; 2-cyano-5-nitrobenzimidazole; 2-cyano-5-chloro-6-nitrobenzimidazole; 2-cyano-5-methylbenzimidazole; 2-cyano-5,6-dimethylbenzimidazole; 2-cyano-5-bromo-6-methylbenzimidazole; 2-cyano-5-methyl-6-tert.-butylbenzimidazole; 2-cyano-5-methoxybenzimidazole; and 2-cyano-5,6-diethoxybenzimidazole.

Compounds of the above structural formula can be prepared by the reaction of a 2-trihalomethyl benzimidazole with ammonia, as illustrated by the following equation:

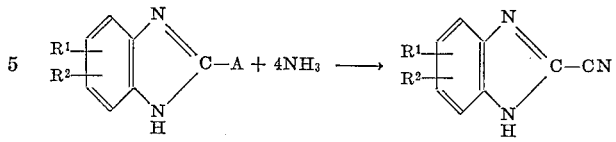

wherein $R^1$ and $R^2$ are as defined above, and wherein A represents a group selected from trichloromethyl, monochlorodifluoromethyl and monofluorodichloromethyl. In general, in practice, the trihalomethyl benzimidazole is added slowly to excess ammonia with stirring, the rate of addition being adjusted to prevent too high a temperature resulting from the exothermic reaction, the stirring being continued until the reaction is substantially complete. The ammonia can be in solution, i.e. ammonium hydroxide, however, improved yields with fewer by-products are obtained by the use of liquid ammonia.

When aqueous ammonia is used, the end product is recovered by filtering the reaction mixture to remove solid impurities, then acidifying the mixture to precipitate the desired 2-cyanobenzimidazole. The product can then be separated say by filtration and washed with water; further purification can be effected, if necessary, by conventional procedures.

When liquid ammonia is used, the excess ammonia can be evaporated by allowing the reaction temperature to rise, after which the remaining solid material can be stirred in water and the ammonium halide removed say by filtration of the mixture. An alternative procedure is to quench the reaction mixture into water, then acidifying the solution and proceeding as with the use of aqueous ammonia.

The following practical examples are illustrative but not limitative of the process of the invention:

EXAMPLE 1

2-trichloromethyl benzimidazole (1.2 g.) was added slowly to liquid ammonia (25 ml.) with stirring. The mixture was allowed to stand until the excess ammonia had evaporated, and the remaining solid was slurried into water and filtered to yield 2-cyanobenzimidazole in 86% yield, M.P. 300° C.

Microanalysis gave the following.— Found (percent): C, 67.0; H, 3.6; N, 29.9. $C_8H_5N_3$ requires (percent): C, 67.1; H, 3.5; N, 29.4.

EXAMPLE 2

2-trichloromethylbenzimidazole (1.2 g.) was added slowly with stirring to a concentrated aqueous ammonia solution (SG 0.88, 10 ml.). After stirring for several hours, a small amount of solid was filtered off and the filtrate was acidified with concentrated hydrochloric acid to give 2-cyanobenzimidazole in 50% yield.

EXAMPLE 3

2-monofluorodichloromethyl benzimidazole was used in place of 2-trichloromethyl benzimidazole in the method described in Example 2, and 2-cyanobenzimidazole was obtained in 30% yield.

EXAMPLE 4

2-monochlorodifluoromethyl benzimidazole was used in place of 2-trichloromethyl benzimidazole in the method described in Example 2, and 2-cyanobenzimidazole was obtained in 45% yield.

The 2-cyanobenzimidazoles of the present invention have high bactericidal activity and are useful as antiseptics. For example 2-cyanobenzimidazole has complete bactericidal activity against Salmonella typhosa at concentration of 1/1000 and less.

Antiseptic or bactericidal compositions containing any of the specified compound/s can be formulated so as to contain say from 0.001% to 50% of active compound, depending upon whether the composition is a concentrate or end use composition, in the latter case the compositions conveniently containing 0.001–1.0% and preferably 0.001–1.0% by weight of the active compound/s, which may be suspended or dispersed or dissolved in a liquid or solid adjuvant. The term adjuvant as used herein and in the appended claims connotes diluents, extenders, carriers, surfactants, solvents and conditioning agents to provide compositions in the form of finely divided particulate solids, granules, pellets, solutions, suspensions, dispersions or emulsions. These compositions can be in liquid or solid-dust form, the liquid form including emulsions, according to conventional practice, any such compositions preferably containing a surfactant. The term "surfactant" as employed in this specification is used as in volume II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the said active compound/s in order to secure better wetting and spreading of the active ingredient in the water vehicle or carrier in which the said active compound/s are insoluble through lowering the surface tension of the water. The surfactants contemplated are the well-known capillary active substances which are non-ionizing (or non-ionic) and which are described in detail in volumes I and II of Schwartz, Perry and Berch's "Surface Active Agents and Detergents," (1958, Interscience Publishers, Inc., New York) and also in the November 1947 issue of Chemical Industries (pages 811–824) in an article entitled "Synthetic Detergents" by John W. McCutcheon and also in the July, August, September and October, 1952 issues of Soap and Sanitary Chemicals under the title "Synthetic Detergents." The disclosures of these articles with respect to non-ionizing capillary active substances are incorporated in this specification by reference in order to avoid unecessary enlargement of this specification. The preferred surfactants are the water-soluble non-ionic surface-active agents set forth in U.S. Pat. No. 2,846,398.

The specified 2-trihalomethyl benzimidazoles, in the case where A is trichloromethyl, employed as a reactant in accordance with the present invention, can be prepared by the reaction of a mono-salt of an appropriately substituted o-phenylenediamine with an alkyl trichloroacetimidate, as illustrated in the following equation:

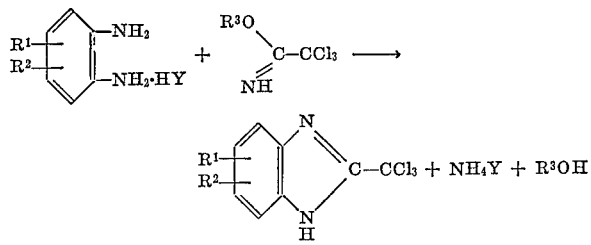

wherein $R^1$ and $R^2$ are as defined above, wherein Y denotes the radical of a mineral acid, preferably hydrochloric acid or sulfuric acid, and wherein $R^3$ denotes an alkyl group, preferably having fewer than five carbon atoms. The two components are mixed together, conveniently in a suitable solvent or diluent. Suitable solvents are ethers, such as dioxan, diethyl ether, 1,2-dimethoxyethane; esters, for example, ethyl acetate; and alcohols such as methanol or ethanol. The convenient procedure is to add the alkyl trichloroacetimidate gradually to a solution or suspension of the phenylenediamine salt. The preferred temperature of reaction and the duration of reaction varies appreciably with the nature of the nuclear substituents denoted by $R^1$ and $R^2$. Electron-donating groups such as alkyl and alkoxy favor the reaction, which then occurs readily at room temperature, in some cases cooling being required as the reaction is exothermic. On the other hand, electron-attracting groups such as halogen retard the reaction and a temperature of 40–50° C. is required for the reaction to be complete within a satisfactory time. The reaction product is isolated and purified by conventional procedure.

Preparation of said 2-trichloromethyl benzimidazoles is illustrated in the following non-limitative practical examples:

EXAMPLE 5

Methyl trichloroacetimidate (0.1 mole) was added to a solution of o-phenylenediamine hydrochloride (0.1 mole) in dry methanol (150 ml.). An exothermic reaction occurred and a solid began to precipitate in half an hour. The reaction was completed in about 2 hours when the mixture was poured into water to give 2-trichloromethyl benzimidazole in 85% yield. This white crystalline solid was recrystallized from glacial acetic acid, dioxan, xylene or chloroform. The material had no melting point up to 360° C. and was identified by infrared (C–Cl peak at 820 cm.$^{-1}$ and ultra violet spectra max. at 284 and 224 m$\mu$) with the following microanalytical figures: Found (percent): C, 40.5; H, 2.4; N, 12.2; Cl, 45.5. $C_8H_5Cl_3N_2$ requires (percent): C, 40.8; H, 2.1; N, 11.8; Cl, 45.2.

The methyl trichloroacetimidate starting material can be prepared from trichloroacetonitrile and methanol in the presence of anhydrous potassium carbonate by the method of Cramer, Ber., 1958, 91, 1049. The product so prepared was obtained in 90% yield and had B.P. 148° C., $n_D^{25}$—1.4785, $d_{25}$–1.45.

EXAMPLE 6

4-chloro-o-phenylenediamine monohydrochloride (0.02 mole) was reacted with methyl trichloroacetimidate (0.02 mole) by allowing them to stand overnight in dry methanol at room temperature. This mixture on quenching gave crude 2-trichloromethyl-5(6)-chloro-benzimidazole in 55% yield with 5% contaminate. The latter was removed by dissolving the mixture in acetic acid, filtration of the insoluble contaminate and aqueous quenching to give the desired compound. Several recrystallizations from xylene gave an analytically pure white crystalline material, M.P. 235° C. (I.R. spectrum aliphatic C—Cl 820 cm.$^{-1}$ aromatic C–Cl 810 cm.$^{-1}$). Found (percent): C, 36.1; H, 1.8; N, 10.4; Cl, 52.3. $C_8H_4Cl_4N_2$ requires (percent): C, 35.7; H, 1.5; N, 10.4; Cl, 52.4. The 4-chloro - o - phenylenediamine monohydrochloride starting material can be prepared from the purified base by addition of hydrochloric acid in methanol and precipitation of the salt with petroleum ether.

EXAMPLE 7

Methyltrichloroacetimidate (0.01 mole) was added to a suspension of 4,5-dimethyl-o-phenylenediamine monohydrochloride (0.01 mole) in dimethoxyethane (80 ml.). No apparent reaction took place and the mixture was allowed to stand at room temperature for 6 days. At the end of this period, filtration of the insoluble materials showed it to contain about 50% of the starting hydrochloride. Addition of petroleum ether (40–60° C.) to the filtrate precipitated an oily material, which was filtered off and the filtrate was evaporated to give crude 2-trichloromethyl-5,6-dimethylbenzimidazole in 35% yield. The crude material was recrystallized three times from benzene to give white crystalline material having M.P. 190° C. After 4 hours drying at 80° C. under vacuum, analysis showed the material to contain ⅓ molecule of benzene of crystallization. Found (percent): C, 50.5; H, 3.8; N, 9.5; Cl, 36.9. $C_{10}H_9N_2Cl_3 \cdot \tfrac{1}{3}C_6H_6$ requires (percent): C, 49.8; H, 3.8; N, 9.6; Cl, 36.8.

After further two recrystallizations from benzene the material with M.P. 190° C. was dried for four hours at 100° C. under vacuum. Analysis showed that it now contained ⅙ molecule of benzene of crystallization. Found (percent): C, 47.6; H, 3.7; N, 10.1; Cl, 38.7.

$$C_{10}H_9N_2Cl_3 \cdot \tfrac{1}{6}C_6H_6$$

requires (percent): C, 47.7; H, 3.7; N, 10.1; Cl, 38.5.

The 4,5-dimethyl-o-phenylenediamine monohydrochloride starting material can be prepared by the addition of hydrochloric acid to the base dissolved in ethyl acetate, followed by precipitation of the salt with petroleum ether. This starting material has a M.P. 225° C. and has only slight solubility in the usual solvents.

EXAMPLE 8

Methyltrichloroacetimidate (26.0 g., 0.15 mole) was added to a solution of 3,4-diaminotoluene hydrochloride (24.0 g., 0.15 mole) in 1,2-dimethoxyethane (400 ml.) at room temperature, and left overnight. Ammonium chloride was then filtered off and petroleum ether (B.P. 40–60° C.) was added to the filtrate to precipitate by-products. These were filtered off and the solution was evaporated to give 5-methyl-2-trichloromethyl benzimidazole in 60% yield.

After recrystallization from benzene, the solid had M.P. 187° C. Found (percent): C, 42.9; H, 2.9; N, 11.0. $C_9H_7N_2Cl_3$ requires (percent): C, 43.2; H, 2.8; N, 11.2.

The specified 2-trihalomethyl benzimidazoles, in the case where A is monochlorodifluoromethyl or monofluorodichloromethyl, employed as a reactant in accordance with the present invention, can be prepared by the method which comprises reacting an appropriate o-phenylenediamine with monochlorodifluoroacetic acid or monofluorodichloroacetic acid. Reaction of the o-phenylenediamine and either of the specified acids can be effected by bringing the reactants together, suitably with the application of heat. This is conveniently effected in an aqueous reaction medium, or in a dilute mineral acid solution such as 4 N hydrochloric acid, preferably by refluxing for a suitable period. The reaction product can be isolated by addition of a base, such as 10% sodium carbonate solution, and, if desired, purified by conventional procedures, the isolated material then being used for the purpose of the invention. Alternatively, the reaction mass resulting from the preparation of the specified 2-trihalomethyl benzimidazole may be employed in the process of the invention, without isolating the 2-trihalomethyl benzimidazole reaction product from the reaction mass.

Preparation of the specified 2-trihalomethyl benzimidazole is illustrated in the following non-limitative practical examples:

EXAMPLE 9

2-monochlorodifluoromethyl benzimidazole was prepared by adding 2-monochlorodifluoroacetic acid (65 g.) to o-phenylenediamine (54 gm.) in 4 N hydrochloric acid (500 ml.) and the solution refluxed for one-half to 3 hours. Alternatively, the same amount of monochlorodifluoroacetic acid is heated with o-phenylenediamine without dilution or in water without the mineral acid. At the end of the reflux period the solution is cooled and carefully neutralized with 10% sodium carbonate solution. The resulting precipitate is filtered off and is essentially pure 2-monochlorodifluoromethyl benzimidazole, M.P. 212° C.

EXAMPLE 10

2 - monochlorodifluoromethyl - 5(6) - chlorobenzimidazole was prepared by reacting 2-monochlorodifluoroacetic acid with 4-chloro-o-phenylenediamine as generally described in Example 9.

EXAMPLE 11

2 - monochlorodifluoromethyl - 5,6 - dichlorobenzimidazole was prepared by reacting 2-monochlorodifluoroacetic acid with 4,5-dichloro-o-phenylenediamine as generally described in Example 9.

EXAMPLE 12

2 - monochlorodifluoromethyl - 5,6 - dimethylbenzimidazole was prepared by reacting 2-monochlorodifluoroacetic acid with 4,5-dimethyl-o-phenylenediamine as generally described in Example 9.

EXAMPLE 13

2 - monochlorodifluoromethyl - 5 - methylbenzimidazole was prepared by reacting 2-monochlorodifluoroacetic acid with 3,4-diaminotoluene, as generally described in Example 9.

The embodiments of the invention in which an exclusive property or privilege is claimed are defined as follows.

1. 2-cyano-5-chlorobenzimidazole.

2. A process for the preparation of a 2-cyanobenzimidazole of the formula:

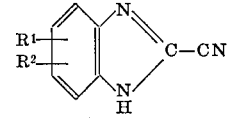

wherein $R^1$ and $R^2$ are independently selected from the group consisting of hydrogen, chlorine, bromine, nitro, alkyl of not more than four carbon atoms, and alkoxy of not more than four carbon atoms, which comprises reacting a benzimidazole of the formula:

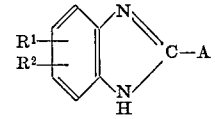

wherein $R^1$ and $R^2$ are as defined above and A is selected from the group consisting of trichloromethyl, monochlorodifluoromethyl and monofluorodichloromethyl with ammonia.

3. A process in accordance with claim 2 wherein the trihalomethyl benzimidazole is reacted with liquid ammonia.

References Cited

Petrov et al.: Chem. Abst., vol. 65, column 8894 (1966, Sept. 12, 1966).

NATALIE TROUSOF, Primary Examiner

U.S. Cl. X.R.

260—575, 578, 579, 999

UNITED STATES PATENT OFFICE
CERTIFICATE OF CORRECTION

Patent No. 3,576,818    Dated April 27, 1971

Inventor(s) Eva Lea Samuel et al

It is certified that error appears in the above-identified patent and that said Letters Patent are hereby corrected as shown below:

Column 1, line 6, insert after "Australia" -- , assignors to Monsanto Chemicals (Australia) Limited --.

Column 2, line 71, cancel "Salmonella" and insert in its place -- Samonella --.

Column 2, line 72, cancel "tration" and insert in its place -- trations --.

Column 3, line 42, cancel "unecessary" and insert in its place -- unnecessary --.

Column 6, line 47, insert after "monofluorodichloromethyl" -- , --.

Signed and sealed this 16th day of November 1971.

(SEAL)
Attest:

EDWARD M. FLETCHER, JR.
Attesting Officer

ROBERT GOTTSCHALK
Acting Commissioner of Pat